(12) United States Patent
Seo

(10) Patent No.: US 11,612,137 B2
(45) Date of Patent: Mar. 28, 2023

(54) SMART LIVESTOCK MANAGEMENT GATE

(71) Applicant: SB Solutions Inc., Ulsan (KR)

(72) Inventor: Seungup Seo, Ulsan (KR)

(73) Assignee: SOLUTIONS INC., Ulsan (KR)

( * ) Notice: Subject to any disclaimer, the term of this patent is extended or adjusted under 35 U.S.C. 154(b) by 0 days.

(21) Appl. No.: 17/535,423

(22) Filed: Nov. 24, 2021

(65) Prior Publication Data

US 2023/0057275 A1 Feb. 23, 2023

(30) Foreign Application Priority Data

Aug. 19, 2021 (KR) ........................ 10-2021-0109289

(51) Int. Cl.
| | | |
|---|---|---|
| *A01K 11/00* | (2006.01) | |
| *A01K 1/00* | (2006.01) | |
| *A01K 29/00* | (2006.01) | |
| *H01Q 21/00* | (2006.01) | |
| *H04B 17/27* | (2015.01) | |
| *G06N 3/00* | (2006.01) | |
| *G01S 13/06* | (2006.01) | |

(52) U.S. Cl.
CPC .......... *A01K 11/006* (2013.01); *A01K 1/0017* (2013.01); *A01K 29/005* (2013.01); *G01S 13/06* (2013.01); *G06N 3/00* (2013.01); *H01Q 21/00* (2013.01); *H04B 17/27* (2015.01)

(58) Field of Classification Search
CPC .. A01K 11/006; A01K 11/007; A01K 29/005; A01K 1/0017; G01S 13/06; G06N 3/00
See application file for complete search history.

(56) References Cited

U.S. PATENT DOCUMENTS

| | | | | | |
|---|---|---|---|---|---|
| 4,075,632 | A | * | 2/1978 | Baldwin | ................ G01K 1/024 |
| | | | | | 455/92 |
| 4,274,083 | A | * | 6/1981 | Tomoeda | ............. G06K 7/0008 |
| | | | | | 119/51.02 |
| 10,149,617 | B2 | * | 12/2018 | Couse | .................. A61B 5/7275 |
| 10,154,655 | B2 | * | 12/2018 | Schab | ................ G08B 21/0453 |

(Continued)

FOREIGN PATENT DOCUMENTS

| | | | |
|---|---|---|---|
| EP | 0299557 B1 | * 10/1991 | |
| EP | 3335549 A1 | * 6/2018 | ........... A01K 11/004 |

(Continued)

OTHER PUBLICATIONS

International Search Report dated May 6, 2022 issued in corresponding Korean Application No. PCT/KR2021/013083, filed Aug. 19, 2021, 4 pages.

*Primary Examiner* — Brady W Frazier
(74) *Attorney, Agent, or Firm* — Christensen O'Connor Johnson Kindness PLLC

(57) ABSTRACT

Smart livestock management method and system based on Internet of things. The smart livestock management system may include a gate. The gate may include a frame forming a moving path of an animal, an external device disposed in the frame and configured to radiate electromagnetic waves toward the moving path and to receive identification information and bio information of the animal from an implant device inserted into the body of the animal passing through the moving path, and a camera configured to obtain image data of the animal passing through the moving path.

8 Claims, 9 Drawing Sheets

(56) References Cited

U.S. PATENT DOCUMENTS

| | | | | |
|---|---|---|---|---|
| 2002/0149484 A1* | 10/2002 | Carrender | ............. | G01S 13/767 |
| | | | | 340/572.1 |
| 2003/0127057 A1* | 7/2003 | Singh | ................... | A01K 13/00 |
| | | | | 119/174 |
| 2004/0155782 A1* | 8/2004 | Letkomiller | ......... | A01K 11/006 |
| | | | | 340/572.1 |
| 2012/0306683 A1* | 12/2012 | Viikari | .................. | G01S 13/756 |
| | | | | 342/51 |
| 2014/0152508 A1* | 6/2014 | Kirk | ...................... | G01S 13/767 |
| | | | | 342/126 |
| 2014/0182519 A1* | 7/2014 | Tupin, Jr. | ............. | A61B 5/6822 |
| | | | | 119/859 |
| 2016/0120154 A1* | 5/2016 | Hill | ...................... | A01K 29/005 |
| | | | | 340/573.3 |
| 2017/0164580 A1* | 6/2017 | Rettedal | ............... | G06F 3/04847 |
| 2018/0070819 A1 | 3/2018 | Kanamori et al. | | |
| 2018/0338681 A1* | 11/2018 | Scherer | ................ | A61B 5/1113 |
| 2018/0350010 A1* | 12/2018 | Kuper | .................... | G06N 20/00 |
| 2019/0133087 A1* | 5/2019 | Yajima | ............... | G06K 17/0029 |
| 2020/0134272 A1* | 4/2020 | Ruiter | .................... | A01K 1/031 |
| 2020/0284899 A1* | 9/2020 | You | ....................... | G01S 7/2813 |
| 2021/0033703 A1* | 2/2021 | Hammerschmidt | .... | G01S 7/411 |

FOREIGN PATENT DOCUMENTS

| | | | | |
|---|---|---|---|---|
| JP | 2020171248 A | 10/2020 | | |
| KR | 1020020024688 A | 4/2002 | | |
| KR | 101912618 A | 10/2018 | | |
| KR | 102099322 A | 4/2020 | | |
| KR | 1020200145694 A | 12/2020 | | |
| WO | WO-2011071395 A1 * | 6/2011 | ........... | H01Q 1/2216 |
| WO | WO-2018143865 A1 * | 8/2018 | .......... | A01K 11/006 |
| WO | WO-2020129056 A1 * | 6/2020 | .............. | A01K 1/00 |

\* cited by examiner

SMART LIVESTOCK MANAGEMENT GATE

CROSS-REFERENCES TO RELATED APPLICATIONS

This application is based on and claims priority under 35 U.S.C. 119 to Korean Patent Application No. 10-2021-0109289, filed on Aug. 19, 2021 in the Korean intellectual property office, the disclosures of which are herein incorporated by reference in their entireties.

TECHNICAL FIELD

The following description relates to a smart livestock management method and system based on Internet of things.

BACKGROUND OF THE DISCLOSURE

The existing radio frequency identification (RFID) tag for an animal has a limit in that it provides only a function for simply tracking and identifying animals. Furthermore, there is an RFID tag for oral inoculation having a capsule form, which has a function for measuring a body temperature or the amount of gastric acid by adding some functions to the function for simply tracking and identifying animals. However, since such a tag is inserted through a throat and mounted on internal of an animal, there is a difficulty when a capsule is inserted, and the tag must be removed after a given period of use time because a battery is embedded in the tag and must be inserted again. Furthermore, if the tag is inserted into a stomach, the tag may cause a problem with the health of an entity due to a problem attributable to the deterioration and damage of the tag when food is inserted into an animal.

The aforementioned information is merely for helping understanding, and may include contents that do not form a part of a conventional technology and may not include contents which may be presented to those skilled in the art by a conventional technology.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

Embodiments of the present disclosure are directed to providing a smart livestock management method and system which can manage an animal by using an external device for obtaining bio information from an implant device inserted under the skin of an animal and a gate to which a camera for obtaining image data of the animal is attached.

In an aspect, there is provided a gate, including a frame forming a moving path of an animal, an external device disposed or integrated in the frame and configured to radiate electromagnetic waves toward the moving path and to receive identification information and bio information of the animal from an implant device inserted into the body of the animal passing or moving through the gate along the moving path, and a camera configured to obtain image data of the animal passing through the gate along the moving path.

According to an aspect, the implant device may be inserted under the skin of the animal and implemented to store the identification information of the animal, measure the bio information of the animal by using the electromagnetic waves radiated by the external device, and transmit the stored identification information and measured bio information of the animal to the external device by using the electromagnetic waves.

According to another aspect, the external device may include an array antenna configured to radiate directivity electromagnetic waves and detects a location of the implant device based on a scattered electromagnetic field received in accordance with the directivity electromagnetic waves radiated through the array antenna.

In another aspect, the external device may include a plurality of antenna devices, a signal generator configured to generate a feeding signal according to a frequency sweep, a phase shifter configured to deliver the feeding signal to the plurality of antenna devices by adjusting a phase of the feeding signal, and a controller configured to detect a location of the implant device based on a scattered electromagnetic field received by the plurality of antenna devices and to detect the identification information and the bio information received from the implant device at the detected location.

According to still another aspect, the gate may further include moving means for moving the gate.

According to still another aspect, the gate may further include at least one sensor configured to determine whether the animal is present or moving along the moving path, the at least one sensor including at least one of a detection sensor, a motion sensor, an infrared sensor, a laser sensor and an ultrasonic sensor.

According to still another aspect, a mode of the external device may be set as a sleep mode. When the at least one detection sensor determines that the animal is present or moving along the moving path, the external device may radiate electromagnetic waves toward the moving path.

According to still another aspect, the gate may further include an access point for connecting at least one of the external device and the camera to a network.

According to still another aspect, the bio information and the image data may be transmitted to a server. The server may collect the bio information and the image data as a health condition index, may generate time-series data by accumulating the health condition index for each given time interval, may calculate a health condition index predictive value at future timing by inputting the generated time-series data to a health condition index prediction model, may compare the calculated health condition index predictive value with a preset threshold, and may generate a danger alert signal when the calculated health condition index predictive value gets out of the threshold.

According to still another aspect, the health condition index prediction model may be trained to receive the time-series data of the health condition indices accumulated over time and to output a predictive value of at least one health condition index at future timing after the time-series data.

An animal can be managed by using the external device for obtaining bio information from the implant device inserted under the skin of the animal and the gate to which the camera for obtaining image data of the animal is attached.

DESCRIPTION OF THE DRAWINGS

The foregoing aspects and many of the attendant advantages of this disclosure will become more readily appreciated as the same become better understood by reference to the following detailed description, when taken in conjunction with the accompanying drawings, wherein.

DETAILED DESCRIPTION

Figure 1:
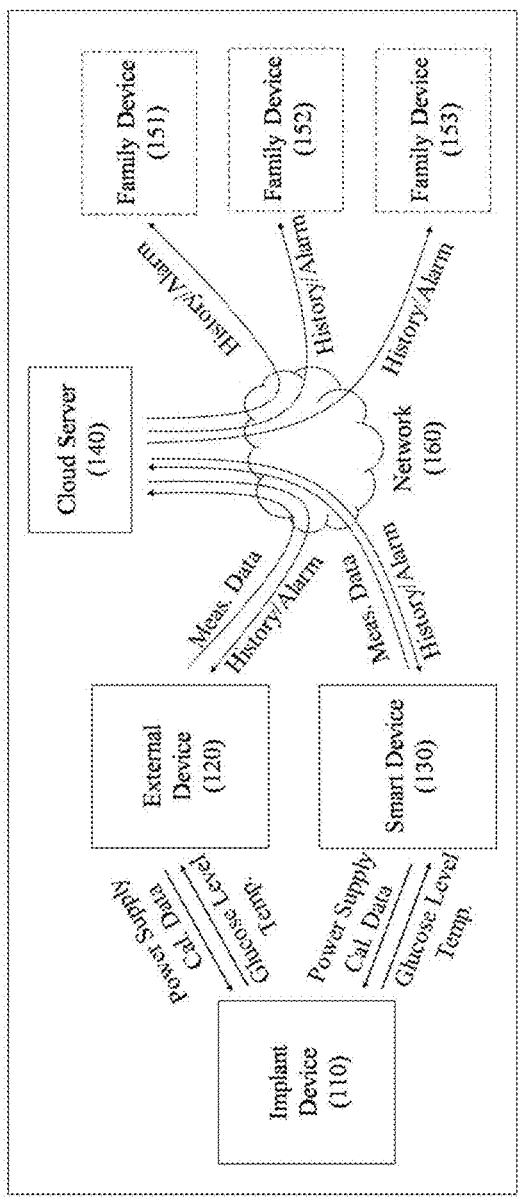
FIG. 1 is a diagram illustrating an example of a smart livestock management system according to an embodiment of the present disclosure.

While illustrative embodiments have been illustrated and described, it will be appreciated that various changes can be made therein without departing from the spirit and scope of the disclosure.

Hereinafter, embodiments are described in detail with reference to the accompanying drawings. However, the embodiments may be changed in various ways, and the scope of right of this patent application is not limited or restricted by such embodiments. It is to be understood that all changes, equivalents and substitutions of the embodiments are included in the scope of right.

Terms used in embodiments are merely used for a description purpose and should not be interpreted as intending to restrict the present disclosure. An expression of the singular number includes an expression of the plural number unless clearly defined otherwise in the context. In this specification, it should be understood that a term, such as "include" or "have", is intended to designate the presence of a characteristic, a number, a step, an operation, a component, a part or a combination of them described in the specification, and does not exclude the existence or possible addition of one or more other characteristics, numbers, steps, operations, components, parts, or combinations of them in advance.

All terms used herein, including technical or scientific terms, have the same meanings as those commonly understood by a person having ordinary knowledge in the art to which an embodiment pertains, unless defined otherwise in the specification. Terms, such as those commonly used and defined in dictionaries, should be construed as having the same meanings as those in the context of a related technology, and are not construed as being ideal or excessively formal unless explicitly defined otherwise in the specification.

Furthermore, in describing the present disclosure with reference to the accompanying drawings, the same component is assigned the same reference regardless of its reference numeral, and a redundant description thereof is omitted. In describing an embodiment, a detailed description of a related known art will be omitted if it is deemed to make the subject matter of the embodiment unnecessarily vague.

Furthermore, in describing elements of an embodiment, terms, such as a first, a second, A, B, (a), and (b), may be used. Such terms are used only to distinguish one component from the other component, and the essence, order, or sequence of a corresponding component is not limited by the terms. When it is said that one component is "connected", "combined", or "coupled" to the other component, the one component may be directly connected or coupled to the other component, but it should also be understood that a third component may be "connected", "combined", or "coupled" between the two components.

A component included in any one embodiment and a component including a common function are described using the same name in another embodiment. Unless described otherwise, a description written in any one embodiment may be applied to another embodiment, and a detailed description in a redundant range is omitted.

FIG. 1 is a diagram illustrating an example of a smart livestock management system according to an embodiment of the present disclosure. The smart livestock management system according to the present embodiment may include an implant device 110, an external device 120, a smart device 130, a cloud server 140 and a plurality of family devices 151 to 153. In this case, the smart device 130 may be an example in which a function of the external device 120 has been implemented in a user terminal, such as a smartphone. The external device 120 and/or the smart device 130 may communicate with the cloud server 140 over a network 160. Furthermore, according to an embodiment, the plurality of family devices 151 to 153 may be omitted. FIG. 1 illustrates three family devices, such as the plurality of family devices 151 to 153, but the number of family devices is not limited to three.

The implant device 110 may include both a signal source for outputting a signal for measuring bio information and a detector for detecting a reflected and returned signal, and may be inserted into a body (e.g., inserted under the skin) of an object. The object may be an animal, such as livestock. For example, the implant device 110 may include an oscillator type sensing circuit. The signal source and the detector may be included in such a sensing circuit. Furthermore, the implant device 110 may operate based on power wirelessly transmitted by the external device 120 or the smart device 130. For example, the implant device 110 may operate in a passive type by an electromagnetic field of the external device 120 or the smart device 130. Furthermore, the implant device 110 may receive calibration data (Cal. Data) from the external device 120 or the smart device 130, and may use the calibration data. For example, the implant device 110 may output a signal through the signal source by using power wirelessly transmitted by the external device 120 or the smart device 130, and may detect a reflected and returned signal by using the detector. In this case, the implant device 110 may calculate bio information (e.g., a glucose level in FIG. 1) by using sensing data, that is, sensed data, and received calibration data, and may deliver the calculated bio information to the external device 120 or the smart device 130.

According to an embodiment, the implant device 110 may include an in-body bio sensor capable of semi-permanently measuring blood glucose. The in-body bio sensor may also be indicated as an invasive type bio sensor, an insertion type bio sensor, or an implant type bio sensor. The in-body bio sensor may be a sensor for sensing a target analyte by using an electromagnetic wave. For example, the in-body bio sensor may measure bio information associated with a target analyte. Hereinafter, the target analyte is a material associated with a living body, and may also be indicated as a living body material or an analyte. For reference, in this specification, the target analyte is chiefly described as blood glucose, but the present disclosure is not limited thereto. The bio information is information related to a bio component of a subject, and may include a concentration, a numerical value, etc. of a target analyte, for example. If a target analyte is blood glucose, bio information may include a blood glucose numerical value.

The in-body bio sensor may measure a bio parameter (hereinafter referred to as a "parameter") associated with the bio component, and may determine bio information from the measured parameter. In this specification, the parameter may indicate a circuit network parameter used to interpret a bio sensor and/or a bio sensing system. Hereinafter, a scattering parameter is chiefly described as an example for convenience of description, but the present disclosure is not limited thereto. For example, an admittance parameter, an impedance parameter, a hybrid parameter, a transmission parameter, etc. may be used as the parameter. In the case of the scattering parameter, a permeability coefficient and a reflection coefficient may be used. For reference, a resonance frequency calculated from the scattering parameter may be related to a concentration of a target analyte. The bio sensor may predict blood glucose by detecting a change in the permeability coefficient and/or the reflection coefficient. For example, a scattering parameter $S_{11}$ may be information on a measured value in a first antenna when a magnetic field radiated by the first antenna of a two-port antenna is reflected and then returned to the first antenna again. A scattering parameter $S_{21}$ may be information on a measured value of a magnetic field that is radiated by the first antenna and measured in the second antenna.

The in-body bio sensor may include a resonator assembly (e.g., an antenna). Hereinafter, the resonator assembly is chiefly described as an example of the antenna. A resonance frequency of the antenna may be represented as a capacitance component and an inductance component as in Equation 1 below.

$$f = \frac{1}{2\pi\sqrt{LC}} \quad \text{[Equation 1]}$$

In Equation 1, f may be a resonance frequency of the antenna included in the bio sensor using an electromagnetic wave, L may be inductance of the antenna, and C may indicate capacitance of the antenna. The capacitance of the antenna C may be proportional to a relative dielectric constant $\varepsilon_r$ as in Equation 2 below.

$$C \propto \varepsilon_r \quad \text{[Equation 2]}$$

The relative dielectric constant $\varepsilon_r$ of the antenna may be influenced by a concentration of a surrounding target analyte. For example, if an electromagnetic wave passes through a material having a given dielectric constant, a change in amplitude and the phase may occur in the transmitted electromagnetic wave due to the reflection and scattering of the electromagnetic wave. The relative dielectric constant $\varepsilon_r$ may also vary because a degree of reflection and/or scattering of the electromagnetic wave is changed based on a concentration of a target analyte present around the bio sensor. This may be interpreted that bio capacitance is formed between the bio sensor and the target analyte due to a fringing field attributable to an electromagnetic wave radiated by the bio sensor including the antenna. A resonance frequency of the antenna is also changed because the relative dielectric constant $\varepsilon_r$ of the antenna is changed by the concentration of the target analyte. In other words, the concentration of the target analyte may correspond to the resonance frequency.

The in-body bio sensor according to an embodiment may radiate an electromagnetic wave while sweeping a frequency, and may measure a scattering parameter according to the radiated electromagnetic wave. The in-body bio sensor may determine a resonance frequency from the measured scattering parameter, and may estimate a blood glucose numerical value corresponding to the determined resonant frequency. The in-body bio sensor may be inserted into a subcutaneous layer, and may predict blood glucose diffused from a blood vessel to an interstitial fluid.

The in-body bio sensor may estimate bio information by determining a frequency shift degree of a resonance frequency. In order to more accurately measure a resonance frequency, a quality factor may be maximized. Hereinafter, an antenna structure having an improved quality factor in an antenna device used in a bio sensor using an electromagnetic wave is described.

The external device 120 and the smart device 130 may basically play the same role called wireless power transmission to the implant device 110 and data collection from the implant device 110. Furthermore, the external device 120 or the smart device 130 may upload, onto the cloud server 140, data measured and collected by the implant device 110 over the network 160. The cloud server 140 may store and manage the uploaded data for each user. For example, the cloud server 140 may transmit, to the external device 120 or the smart device 130, an alarm based on the uploaded data or a history of the uploaded data based on the uploaded data for each user. To this end, the cloud server 140 may include a function for analyzing the uploaded data.

Figure 2:
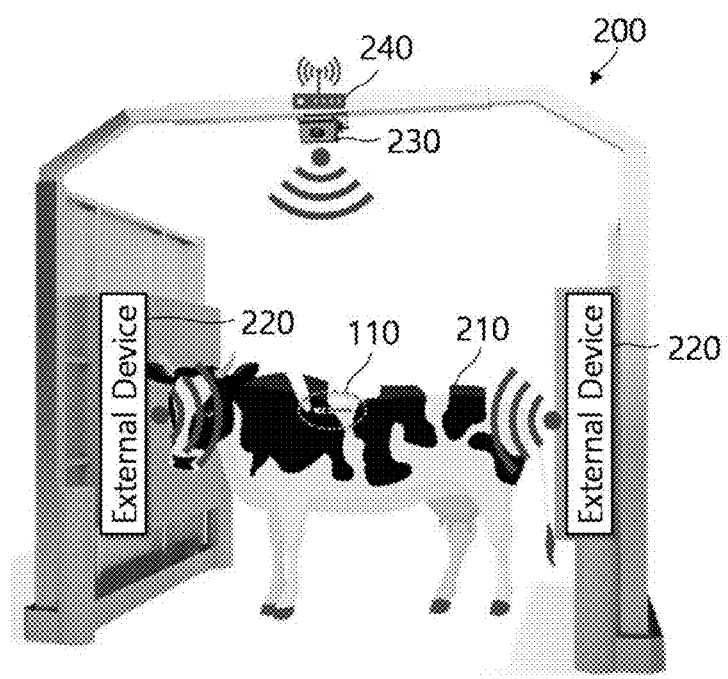
FIG. 2 is a diagram illustrating an example of a gate included in the smart livestock management system according to an embodiment of the present disclosure.

FIG. 2 is a diagram illustrating an example of a gate included in the smart livestock management system according to an embodiment of the present disclosure.

As already described, the implant device 110 may be inserted into the body of an animal 210 that is a subject to be measured. In this case, the implant device 110 can solve inconvenience attributable to oral inoculation and solve a problem with the breakdown and damage of a tag because the implant device is inserted under the skin of the animal 210. Furthermore, the implant device 110 can be semi-permanently used by being inserted into a subject to be measured once by using a method of not embedding a separate battery in the implant device.

A gate 200 may include at least one external device 220 and a camera 230. In this case, each of the at least one external device 220 may correspond to the external device 120 described with reference to FIG. 1. The camera 230 may be implemented to obtain image data of the animal 210 within the gate 200.

Furthermore, the gate 200 may further include a frame forming at least some moving path of the animal 210. In this case, the at least one external device 220 and the camera 230 may be implemented to obtain bio information and image data of the animal 210 that passes through the moving path along the frame.

According to an embodiment, the gate 200 may include an access point 240 so that the at least one external device 220 and the camera 230 can communicate with another device (e.g., the smart device 130, the cloud server 140, the plurality of family devices 151 to 153, a separate server and/or PC), but the present disclosure is not limited thereto. For example, the access point 240 may be installed separately from the gate 200.

Communication between the external device 120 and the cloud server 140, communication between the smart device 130 and the cloud server 140 and/or communication between the cloud server 140 and family devices 151 to 153 may be performed through Wi-Fi or 5 generation mobile communication technology (5G), but the present disclosure is not limited thereto. For example, the external device 120 may communicate with the access point 240 through Bluetooth. The access point 240 may communicate with the cloud server 140 over given one or more of networks, such as a personal area network (PAN), a local area network (LAN), a campus area network (CAN), a metropolitan area network (MAN), a wide area network (WAN), a broadband network (BBN), or the Internet. Such a network may include given one or more of network topologies, including a bus network, a star network, a ring network, a mesh network, a star-bus network, or a tree or hierarchical network, but the present disclosure is not limited thereto.

The at least one external device 220 transmits wireless power to the implant device 110, and needs to be identify a location of the implant device 110 in order to receive identification information (e.g., an identifier of the animal 210) and bio information of the animal 210 from the implant device 110.

Figure 3:
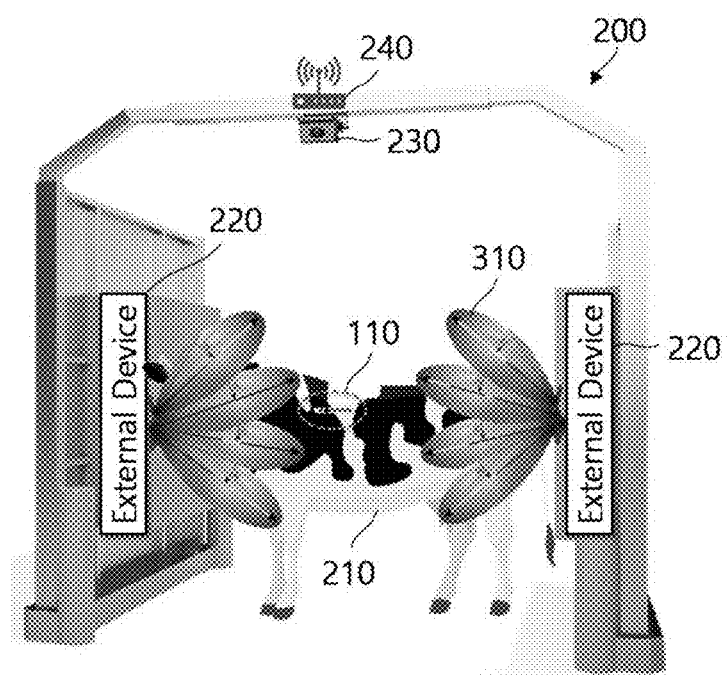
FIG. 3 is a diagram illustrating an example of a gate which radiates a directivity electromagnetic wave in an embodiment of the present disclosure.

FIG. 3 is a diagram illustrating an example in which directivity electromagnetic waves are radiated in an embodiment of the present disclosure. At least one external device 220 included in the gate 200 may include an array antenna therein, and may radiate electromagnetic waves 310 having directivity. At this time, the at least one external device 220 may detect a location of the implant device 110 inserted into the body of the animal 210 based on a scattered electromagnetic field received in accordance with the radiated electromagnetic waves, and may detect a desired signal from the implant device 110.

Figure 4:
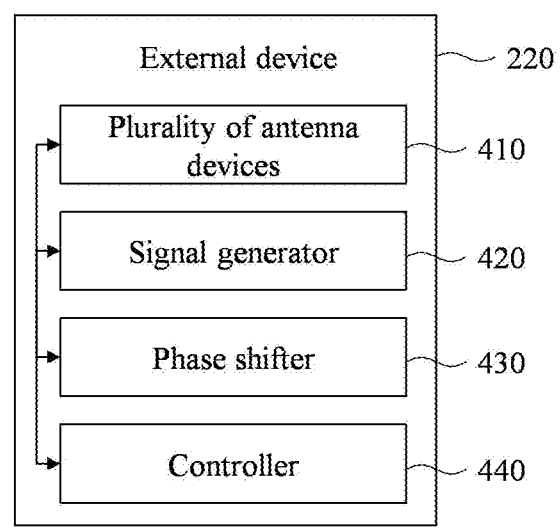
FIG. 4 is a diagram illustrating an example of an internal structure of an external device according to an embodiment of the present disclosure.

FIG. 4 is a diagram illustrating an example of an internal structure of an external device according to an embodiment of the present disclosure. An external device 220 according to the present embodiment may include a plurality of antenna devices 410, a signal generator 420, a phase shifter 430 and a controller 440. The signal generator 420 may generate a feeding signal according to a frequency sweep. The phase shifter 430 may deliver the feeding signal to the plurality of antenna devices 410 by adjusting a phase of the feeding signal. In this case, a beam can be steered in a desired direction by adjusting a frequency and phase of a feeding signal to be radiated by each of the antennas. At this time, an electromagnetic field scattered in accordance with the radiated electromagnetic wave may be received by the plurality of antenna devices 410. The controller 440 may detect a signal by identifying a location of a sensor of the implant device 110 within the animal 210 based on the received scattered electromagnetic field. In other words, the controller 440 may detect identification information and bio information transmitted by the implant device 110 based on the radiated electromagnetic wave by radiating an electromagnetic wave to the detected location.

Figure 5:
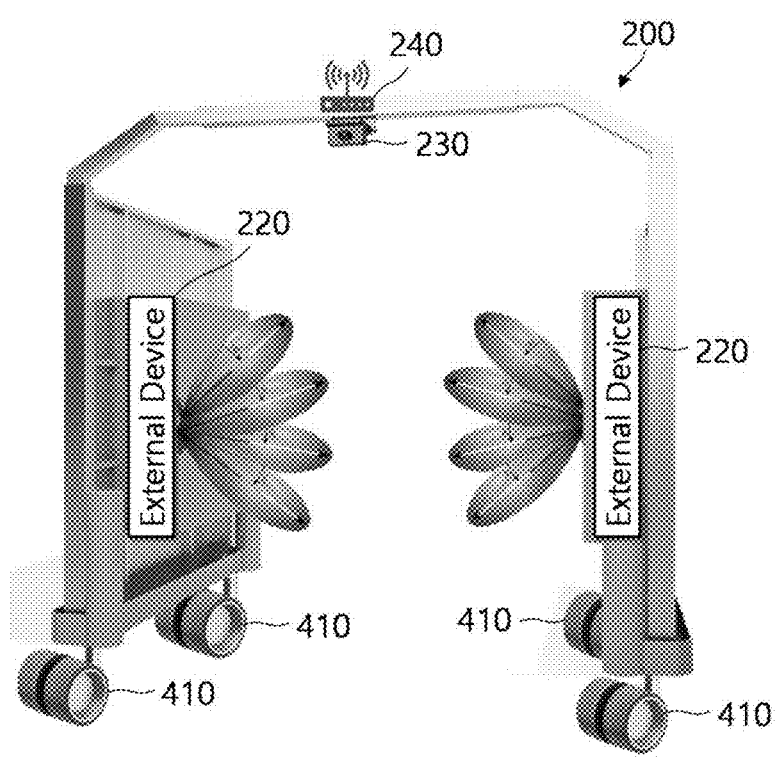
FIG. 5 is a diagram illustrating an example of a movable type gate in an embodiment of the present disclosure.

FIG. 5 is a diagram illustrating an example of a movable type gate in an embodiment of the present disclosure. FIG. 5 illustrates an example in which a gate 200 is constructed in a movable type by mounting a plurality of wheels 410 on the gate 200. The movable type gate 200 is easily disposed on a moving path of the animal 210, and can measure bio information of the animal 210. In the embodiment of FIG. 5, the plurality of wheels 410 is illustrated, but moving means capable of improving moving convenience of the gate 200 may be used without any restriction.

Figure 6:
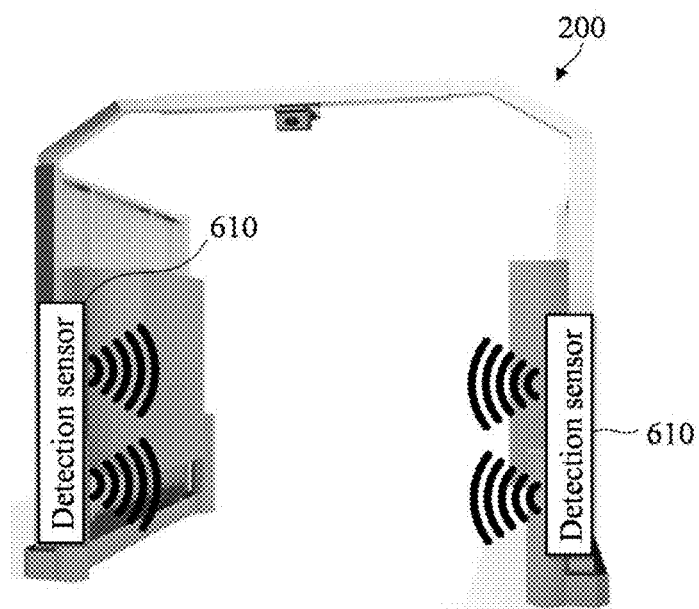
FIG. 6 is a diagram illustrating an example of a gate including a detection sensor in an embodiment of the present disclosure.

FIG. 6 is a diagram illustrating an example of a gate including a detection sensor in an embodiment of the present disclosure. A gate 200 according to the present embodiment may further include at least one detection sensor 610. In this case, a mode of the external device 220 may be set as a sleep mode in a usual day. Thereafter, when an event according to the entry of the animal 210 into the gate 200 occurs through the detection sensor 610, a mode of the external device 220 may be changed into a wake-up mode, and the external device 220 may initiate an operation. In other words, the external device 220 may operate only when the entry of the animal 210 into the gate 200 occurs through the at least one detection sensor 610, may obtain bio information from the implant device 110 inserted into the body of the animal 210, and may transmit the bio information to another device (e.g., the smart device 130, the cloud server 140, the plurality of family devices 151 to 153, a separate server and/or PC). If the animal 210 gets out of the gate 200, the mode of the external device 220 may be changed into the sleep mode. To this end, the at least one detection sensor 610 may be implemented to identify whether the animal 210 is placed, is present or is moving within the gate 200 (or whether the animal 210 is placed on a moving path formed by the frame included in the gate 200). Through a change into the sleep mode and wake-up mode of the external device 220 through the at least one detection sensor 610, power consumption of the smart livestock management system can be minimized, and a use time can be significantly increased compared to an operation at normal times.

The gate 200 may include a processor for controlling operations of the at least one external device 220, the camera 230 and/or the detection sensor 610. According to an embodiment, the processor may be separately included in the gate 200, but the controller 440 of the at least one external device 220 may be implemented to act as the processor.

The cloud server 140 may generate time-series data by accumulating bio information received to predict a health danger of the animal 210. The time-series data may be represented as a two-dimensional array composed of the bio information within a given time section. For example, the cloud server 140 may accumulate and store, as a health condition index (HCI), bio information for each item, such as blood pressure, oxygen saturation, blood glucose, a heart rate, or a body temperature measured with respect to an object, such as the animal 210. In this case, the HCI may be accumulated and stored for each piece of identification information. In this case, image data obtained by the camera 230 may also be considered as one item of the HCI.

Figure 7:
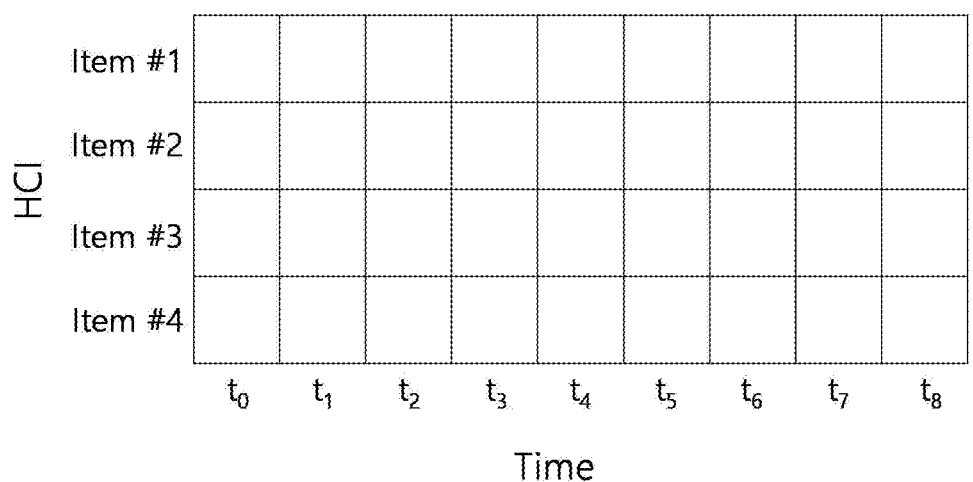
FIG. 7 is a diagram illustrating an example of time-series data according to an embodiment of the present disclosure.

FIG. 7 is a diagram illustrating an example of time-series data according to an embodiment of the present disclosure. FIG. 7 illustrates an example in which a plurality of items of an HCI as bio information is represented as a two-dimensional array over time.

In this case, the cloud server 140 may predict an HCI after several minutes to several months by analyzing generated time-series data through an artificial intelligence algorithm.

Figure 8:
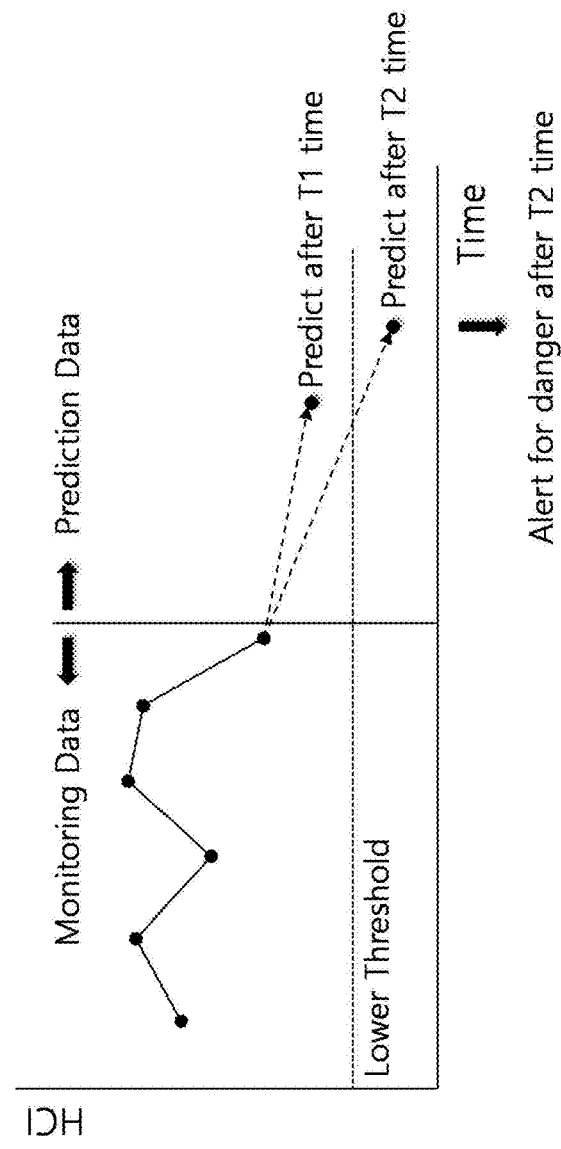
FIG. 8 is a diagram illustrating an example in which HCIs are predicted according to an embodiment of the present disclosure.

FIG. 8 is a diagram illustrating an example in which HCIs are predicted according to an embodiment of the present disclosure. The embodiment of FIG. 8 illustrates an example in which the cloud server 140 predicts HCIs after a time T1 and a time T2 by using monitored data (e.g., time-series data generated by accumulating HCIs received from the external device 220). In this case, since a predictive value after the time T2 is a lower threshold or less, the cloud server 140 may generate a danger alert signal after the time T2, and may transmit the generated danger alert signal to at least one of the external device 220, the smart device 130 and the plurality of family devices 151 to 153.

The danger alert signal may include identification information of a corresponding animal 210. A device that has received the danger alert signal may output, to a user, a warning signal along with the identification information.

The artificial intelligence algorithm of the cloud server 140 which analyze the time-series data may use at least one of various algorithms, such as multi-layer perceptron (MLP), a deep neural network (DNN), a convolutional neural network (CNN), a recurrent neural network (RNN), a group convolutional neural network (G-CNN), a recurrent convolutional neural network (R-CNN), but the present disclosure is not limited to a specific algorithm.

For example, the cloud server 140 may generate an HCI prediction model by training an artificial intelligence algorithm model through machine learning using learning data. The machine learning may use supervised learning or unsupervised learning, and may use reinforcement learning of the unsupervised learning. This is merely an example, and a learning method of the present disclosure is not limited thereto.

Figure 9:
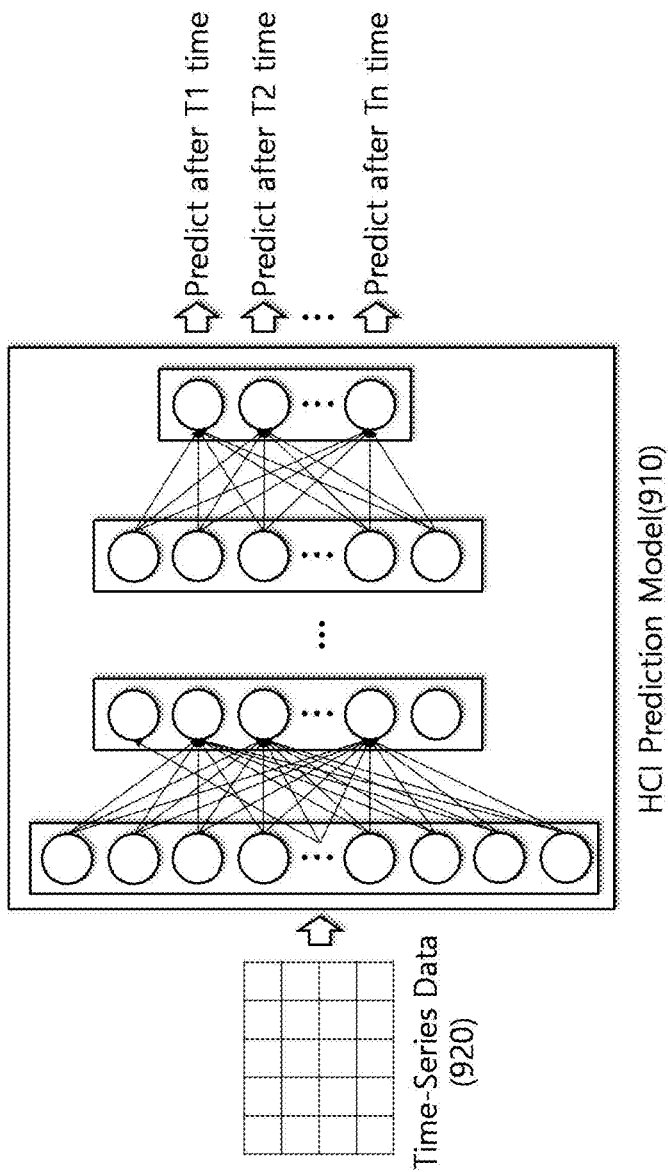
FIG. 9 is a concept view predicting HCIs through an HCI prediction model according to an embodiment of the present disclosure.

FIG. 9 is a concept view predicting HCIs through an HCI prediction model according to an embodiment of the present disclosure. An HCI prediction model 910 may output a predictive value after each time through a calculation process within the HCI prediction model 910 when receiving time-series data 920. A future time (time T1, time T2, ..., Tn) when an HCI will be predicted may be preset in a model selection process. Learning data may be prepared, if necessary. A model that predicts an HCI in one time (e.g., time T1) may be generated, or a model that predicts HCIs in several times may be generated as in the embodiment of FIG. 9.

In the aforementioned embodiments, an example in which the cloud server 140 processes the generation and prediction of time-series data has been described. According to an embodiment, the generation and prediction of time-series data may be processed by a separate server and/or PC.

As described above, according to embodiments of the present disclosure, an animal can be managed using the external device for obtaining bio information from the implant device inserted under the skin of the animal and the gate to which the camera for obtaining image data of the animal has been attached.

The aforementioned apparatus (or device) may be implemented as a hardware component or a combination of a hardware component and a software component. For example, the device and component described in the embodiments may be implemented using a processor, a controller, an arithmetic logic unit (ALU), a digital signal processor, a microcomputer, a field programmable gate array (FPGA), a programmable logic unit (PLU), a microprocessor or one or more general-purpose computers or special-purpose computers, such as any other device capable of executing or responding to an instruction. The processing device may perform an operating system (OS) and one or more software applications executed on the OS. Furthermore, the processing device may access, store, manipulate, process and generate data in response to the execution of software. For convenience of understanding, one processing device has been illustrated as being used, but a person having ordinary skill in the art may understand that the processing device may include a plurality of processing elements and/or a plurality of types of processing elements. For example, the processing device may include a plurality of processors or a single processor and a single controller. Furthermore, a different processing configuration, such as a parallel processor, is also possible.

Software may include a computer program, a code, an instruction or a combination of one or more of them and may configure a processing device so that the processing device operates as desired or may instruct the processing devices independently or collectively. The software and/or the data may be embodied in any type of machine, a component, a physical device, a computer storage medium or a device in order to be interpreted by the processor or to provide an instruction or data to the processing device. The software may be distributed to computer systems connected over a network and may be stored or executed in a distributed manner. The software and the data may be stored in one or more computer-readable recording media.

The method according to embodiments may be implemented in the form of a program instruction executable by various computer means and stored in a computer-readable medium. The computer-readable medium may include a program instruction, a data file, and a data structure solely or in combination. The medium may continue to store a program executable by a computer or may temporarily store the program for execution or download. Furthermore, the medium may be various recording means or storage means having a form in which one or a plurality of pieces of hardware has been combined. The medium is not limited to a medium directly connected to a computer system, but may be one distributed over a network. An example of the medium may be one configured to store program instructions, including magnetic media such as a hard disk, a floppy disk and a magnetic tape, optical media such as a CD-ROM and a DVD, magneto-optical media such as a floptical disk, a ROM, a RAM, and a flash memory. Furthermore, other examples of the medium may include an app store in which apps are distributed, a site in which other various pieces of software are supplied or distributed, and recording media and/or storage media managed in a server. Examples of the program instruction include a high-level language code executable by a computer by using an interpreter in addition to a machine-language code, such as that written by a compiler.

As described above, although the embodiments have been described in connection with the limited embodiments and the drawings, those skilled in the art may modify and change the embodiments in various ways from the description. For example, proper results may be achieved although the aforementioned descriptions are performed in order different from that of the described method and/or the aforementioned elements, such as the system, configuration, device, and circuit, are coupled or combined in a form different from that of the described method or replaced or substituted with other elements or equivalents.

Accordingly, other implementations, other embodiments, and the equivalents of the claims fall within the scope of the claims.

The embodiments of the disclosure in which an exclusive property or privilege is claimed are defined as follows:

1. A gate comprising:
   a frame forming a moving path of an animal;
   an external device disposed or integrated in the frame and configured to radiate electromagnetic waves toward the moving path and to receive identification information and bio information of the animal from an implant device inserted into a body of the animal passing or moving through the gate along the moving path;

a camera configured to obtain image data of the animal passing or moving through the gate along the moving path;
an access point configured to allow the external device and the camera to communicate with a smart device or cloud server; and
a plurality of wheels mounted on the frame and configured to move the gate.

2. The gate of claim 1, wherein the implant device is inserted under a skin of the animal and implemented to:
store the identification information of the animal,
measure the bio information of the animal by using the electromagnetic waves radiated by the external device, and
transmit the stored identification information and measured bio information of the animal to the external device by using the electromagnetic waves.

3. The gate of claim 1, wherein the external device comprises an array antenna configured to radiate directivity electromagnetic waves and detect a location of the implant device based on a scattered electromagnetic field received in accordance with the directivity electromagnetic waves radiated through the array antenna.

4. The gate of claim 1, wherein the external device comprises:
a plurality of antenna devices;
a signal generator configured to generate a feeding signal according to a frequency sweep,
a phase shifter configured to deliver the feeding signal to the plurality of antenna devices by adjusting a phase of the feeding signal; and
a controller configured to detect a location of the implant device based on a scattered electromagnetic field received by the plurality of antenna devices and to detect the identification information and the bio information received from the implant device at the detected location.

5. The gate of claim 1, further comprising at least one sensor configured to determine whether the animal is present or moving along the moving path, the at least one sensor including at least one of a detection sensor, a motion sensor, an infrared sensor, a laser sensor and an ultrasonic sensor.

6. The gate of claim 5, wherein:
a mode of the external device is set as a sleep mode, and
when the at least one sensor determines that the animal is present or moving along the moving path, the external device radiates electromagnetic waves toward the moving path.

7. The gate of claim 1, wherein:
the bio information and the image data are transmitted to a server, and the server collects the bio information and the image data as a health condition index,
generates time-series data by accumulating the health condition index for a plurality of given time intervals,
calculates a health condition index predictive value at future timing by inputting the generated time-series data to a health condition index prediction model,
compares the calculated health condition index predictive value with a preset threshold, and
generates a danger alert signal when the calculated health condition index predictive value gets out of the threshold.

8. The gate of claim 7, wherein the health condition index prediction model is trained to:
receive the time-series data of the health condition indices accumulated over time, and output a predictive value of at least one health condition index at future timing after the time-series data.

* * * * *